(12) United States Patent
Mao

(10) Patent No.: US 9,235,468 B2
(45) Date of Patent: Jan. 12, 2016

(54) SYSTEMS AND METHODS TO IMPROVE THE RELIABILITY AND LIFESPAN OF FLASH MEMORY

(71) Applicant: QUALCOMM Incorporated, San Diego, CA (US)

(72) Inventor: Yinian Mao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 152 days.

(21) Appl. No.: 13/861,691

(22) Filed: Apr. 12, 2013

(65) Prior Publication Data

US 2014/0310573 A1    Oct. 16, 2014

(51) Int. Cl.
    G06F 11/10    (2006.01)

(52) U.S. Cl.
    CPC .................. *G06F 11/1068* (2013.01)

(58) Field of Classification Search
    CPC .................................................. G06F 11/1076
    USPC .................................. 714/773, 704, 807, 6.2
    See application file for complete search history.

(56) References Cited

U.S. PATENT DOCUMENTS

| | | | |
|---|---|---|---|
| 7,739,576 B2 | 6/2010 | Radke | |
| 8,213,229 B2 | 7/2012 | Wilson et al. | |
| 8,296,620 B2 | 10/2012 | Chen et al. | |
| 8,365,028 B2 | 1/2013 | Murray | |
| 8,560,881 B2 * | 10/2013 | Frost et al. | 714/6.2 |
| 2009/0132889 A1 | 5/2009 | Radke | |
| 2010/0107004 A1 | 4/2010 | Bottelli et al. | |
| 2010/0293321 A1 | 11/2010 | Weingarten | |
| 2011/0060967 A1 | 3/2011 | Warren | |
| 2012/0151260 A1 | 6/2012 | Zimmermann et al. | |
| 2012/0284587 A1 | 11/2012 | Yu et al. | |
| 2012/0311393 A1 | 12/2012 | Bueb et al. | |
| 2014/0082459 A1 * | 3/2014 | Li et al. | 714/773 |

OTHER PUBLICATIONS

Invitation to Pay Additional Fees and Partial International Search for PCT/US2014/033480, mailed Oct. 1, 2014, 6 pages.
International Search Report and Written Opinion for PCT/US2014/033480, mailed Jan. 29, 2015, 24 pages.
Invitation to Restrict or Pay Additional Fees for PCT/US2014/033480, mailed Jun. 24, 2015, 3 pages.
Second Written Opinion for PCT/US2014/033480, mailed Aug. 3, 2015, 17 pages.

* cited by examiner

*Primary Examiner* — Fritz Alphonse
(74) *Attorney, Agent, or Firm* — Withrow & Terranova, PLLC

(57) ABSTRACT

A method for controlling flash memory includes selecting a new forward error correction (FEC) parameter set that provides more redundancy than a current FEC parameter set. The method also includes coding source information bits, using the new FEC parameter set, during write operations to a first corrupted page in the flash memory. The method further includes mapping the first corrupted page and at least one additional corrupted page in the flash memory to a single logical page with an expected page size.

37 Claims, 9 Drawing Sheets

SYSTEMS AND METHODS TO IMPROVE THE RELIABILITY AND LIFESPAN OF FLASH MEMORY

TECHNICAL FIELD

The present disclosure relates generally to flash memory. More specifically, the present disclosure relates to systems and methods to improve the reliability and lifespan of flash memory.

BACKGROUND

Electronic devices (cellular telephones, wireless modems, computers, digital music players, Global Positioning System units, Personal Digital Assistants, gaming devices, etc.) have become a part of everyday life. Small computing devices are now placed in everything from automobiles to housing locks. The complexity of electronic devices has increased dramatically in the last few years. For example, many electronic devices have one or more processors that help control the device, as well as a number of digital circuits to support the processor and other parts of the device.

Electronic devices often store data in memory. The memory may be flash memory, in particular, NAND flash memory (i.e., flash memory that uses NAND logic). Therefore, benefits may be realized by improving the reliability and lifespan of flash memory.

SUMMARY

A method for controlling flash memory is described. The method includes selecting a new forward error correction (FEC) parameter set that provides more redundancy than a current FEC parameter set. Source information bits are coded, using the new FEC parameter set, during write operations to a first corrupted page in the flash memory. The first corrupted page and at least one additional corrupted page in the flash memory are mapped to a single logical page with an expected page size.

The selecting may be performed in response to a write failure to the first corrupted page or when an estimated page error rate exceeds an FEC threshold during reading operations from the first corrupted page. The selecting may include selecting the new FEC parameter set from among multiple FEC parameter sets, each providing different amounts of redundancy. The new FEC parameter set may have a higher number of bit errors that can be corrected per page than the current FEC parameter set.

The method may also include storing the new FEC parameter set in the first corrupted page and another FEC parameter set in the at least one additional corrupted page. The method may further include storing, in the first corrupted page and the at least one additional corrupted page, a mapping indicator that indicates the mapping from the first corrupted page and the at least one additional corrupted page to the single logical page. The method may additionally include storing, in the first corrupted page and the at least one additional corrupted page, order information indicating an arrangement of data stored in the first corrupted page and the at least one additional corrupted page. The method may also include reading and writing data to the single logical page based on received instructions.

The method may also include recording the first corrupted page to a partially degraded page list. The partially degraded page list may be searched for the at least one additional corrupted page. The method may also include determining that a sum of usable data bytes of the first corrupted page and the at least one additional corrupted page is greater than or equal to the expected page size. Grouping information may be recorded in a logical page information table. The grouping information may be recorded to meta data of the first corrupted page and the at least one additional corrupted page.

The method may also include maintaining interface consistency for the single logical page. The method may further include estimating a page error rate. Selecting the new FEC parameter set may be based on the page error rate.

An electronic device for controlling flash memory is also described. The electronic device includes a processor and memory in electronic communication with the processor. The memory includes executable instructions. A new forward error correction (FEC) parameter set is selected that provides more redundancy than a current FEC parameter set. Source information bits are coded, using the new FEC parameter set, during write operations to a first corrupted page in the flash memory. The first corrupted page and at least one additional corrupted page in the flash memory are mapped to a single logical page with an expected page size.

A computer-program product for controlling flash memory is also described. The computer-program product includes a non-transitory tangible computer-readable medium having instructions thereon. The instructions include code for causing an electronic device to select a new forward error correction (FEC) parameter set that provides more redundancy than a current FEC parameter set. The instructions also include code for causing the electronic device to code source information bits, using the new FEC parameter set, during write operations to a first corrupted page in the flash memory. The instructions further include code for causing the electronic device to map the first corrupted page and at least one additional corrupted page in the flash memory to a single logical page with an expected page size.

An electronic device for controlling flash memory is also described. The electronic device includes circuitry configured to select a new forward error correction (FEC) parameter set that provides more redundancy than a current FEC parameter set. The circuitry is also configured to code source information bits, using the new FEC parameter set, during write operations to a first corrupted page in the flash memory. The circuitry is further configured to map the first corrupted page and at least one additional corrupted page in the flash memory to a single logical page with an expected page size.

An apparatus for controlling flash memory is also described. The apparatus includes means for selecting a new forward error correction (FEC) parameter set that provides more redundancy than a current FEC parameter set. The apparatus also includes means for coding source information bits, using the new FEC parameter set, during write operations to a first corrupted page in the flash memory. The apparatus further includes means for mapping the first corrupted page and at least one additional corrupted page in the flash memory to a single logical page with an expected page size.

A method for controlling flash memory is also described. The method includes writing data to a page in the flash memory. A usable memory indicator that indicates an amount of usable data bytes and corrupted data bytes of the page is determined. The usable memory indicator is stored. Whether to store additional data in the page is determined based on the usable memory indicator.

The storing may include storing the usable memory indicator in the page. The storing may also include storing the usable memory indicator in a flash controller. The usable memory indicator may indicate an amount of usable data bytes of the page that is less than an expected page size for an operating system.

The method may also include performing a subsequent write operation or a subsequent read operation from the page. A page error rate may be estimated based on the subsequent write operation or the subsequent read operation from the page. The usable memory indicator may be updated based on the page error rate.

An electronic device for controlling flash memory is also described. The electronic device includes a processor and memory in electronic communication with the processor. The memory includes executable instructions. Data is written to a page in the flash memory. A usable memory indicator that indicates an amount of usable data bytes and corrupted data bytes of the page is determined. The usable memory indicator is stored. Whether to store additional data in the page is determined based on the usable memory indicator.

A computer-program product for controlling flash memory is also described. The computer-program product includes a non-transitory tangible computer-readable medium having instructions thereon. The instructions include code for causing an electronic device to write data to a page in the flash memory. The instructions also include code for causing the electronic device to determine a usable memory indicator that indicates an amount of usable data bytes and corrupted data bytes of the page. The instructions further include code for causing the electronic device to store the usable memory indicator. The instructions additionally include code for causing the electronic device to determine whether to store additional data in the page based on the usable memory indicator.

An electronic device for controlling flash memory is also described. The electronic device includes circuitry configured to write data to a page in the flash memory. The circuitry is also configured to determine a usable memory indicator that indicates an amount of usable data bytes and corrupted data bytes of the page. The circuitry is further configured to store the usable memory indicator. The circuitry is additionally configured to determine whether to store additional data in the page based on the usable memory indicator.

An apparatus for controlling flash memory is also described. The apparatus includes means for writing data to a page in the flash memory. The apparatus also includes means for determining a usable memory indicator that indicates an amount of usable data bytes and corrupted data bytes of the page. The apparatus further includes means for storing the usable memory indicator. The apparatus additionally includes means for determining whether to store additional data in the page based on the usable memory indicator.

DETAILED DESCRIPTION

Many of today's consumer electronic devices use NAND flash memory. Flash is a non-volatile memory that can retain stored data even after power is removed. NAND flash, which is one type of flash, is a high-density design and has certain advantages over other types of memory, including a large storage capacity (e.g., one giga-bit or more), good speed for continued access, and low cost. However, NAND flash also has inherent drawbacks, including an increased susceptibility to bit errors over the NAND flash's operating lifetime.

NAND flash may be single-level cell NAND flash or multi-level cell (MLC) NAND flash. As compared to single-level cell NAND flash, MLC NAND flash can provide high memory capacity, at a cost of lower reliability. NAND flash is typically accessed (via read and write operations, for instance) in a unit of pages, one page at a time, with the usable data bytes of each page being of a particular size (e.g., 512 bytes, 2048 bytes or 4096 bytes). NAND flash has a limit to the number of write cycles in its lifetime. Types of flash device errors can be classified as program errors, retention errors, erase errors, and read errors. In general, all types of errors will increase with the number of cycles that the raw flash cells have been programmed. The present systems and methods may be used to increase the reliability and lifespan of flash memory due to all types of errors. Some flash controllers (or flash drivers) may mark a page as bad and remap the page to another block of memory, i.e., the capacity of the flash is reduced with each lost page. Therefore, benefits may be realized by modifying how a page is determined to be bad and how a page may be mapped with other pages.

Figure 1:
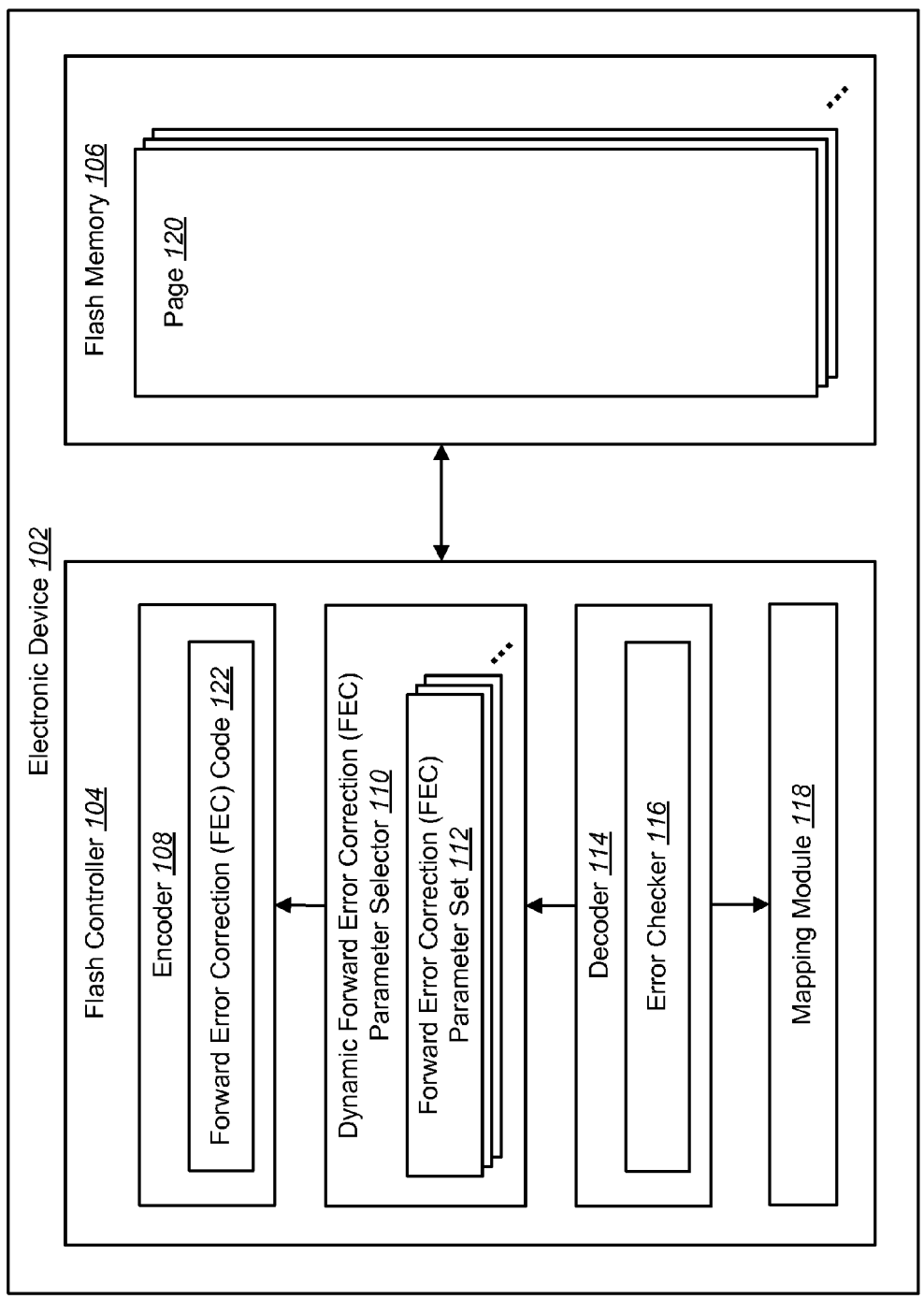
FIG. 1 is a block diagram illustrating an electronic device that includes a flash controller for improving the reliability and lifespan of flash memory.

FIG. 1 is a block diagram illustrating an electronic device 102 that includes a flash controller 104 for improving the reliability and lifespan of flash memory 106. The flash controller 104 may act as an interface between the flash memory 106 and an operating system or other user application. The flash controller 104 may hide the complexity of managing the physical cells (e.g., pages 120) within the flash memory 106. The operating system or other user application may provide source information bits to be stored in the flash memory 106 to the flash controller 104, which stores and retrieves the source information bits from the flash memory 106. It should be noted that the flash controller 104 may be implemented as hardware (e.g., circuitry), software (e.g., a flash driver) or a combination of hardware and software. It should also be noted that one or more of the elements illustrated in FIG. 1 may be implemented in circuitry (e.g., integrated circuitry) in some configurations.

Before writing to flash memory 106, a flash controller 104 may encode the source information bits with a forward error correction (FEC) code 122 to produce code words. Persistent memory storage (such as flash memory 106) may utilize an FEC code 122 to encode source information bits. An FEC code 122 is an algorithm that is used for controlling data storage errors. The source information bits may be stored in a redundant way using an error-correcting code (ECC). The redundancy associated with FEC may allow the flash controller 104 to detect a limited number of errors that may occur during a write/read process, and often to correct these errors without reference to the original source information bits.

In one configuration, the flash controller 104 may convert the source information bits into code words. For example, a write process may encode the source information bits (or symbols) into code words, and store the encoded code words to the flash memory 106. A read process may retrieve the code words from the flash memory 106 and decode the code words into the source information bits. During this process, the FEC code 122 may be used to detect errors and, in some cases, correct errors. There are different types of FEC code 122 that may be used to encode source information bits. For example, the FEC code 122 may be a Reed Solomon (RS) code.

The encoding operation may introduce some redundant data (e.g., FEC bits) to allow error detection and correction. Different parameters may be selected for a given FEC code 122 scheme that enable better error detection and correction, but require more error correcting FEC bits to be stored. For example, for a given FEC code 122, different FEC parameter sets 112 may be selected to adjust the error-correction capability of the FEC code 122. In one configuration, an FEC parameters set 112 for linear FEC codes 122 may include the number of information bits (N), the number of error correction bits (k) and the number of bit errors that can be corrected (t). In another configuration, an FEC parameter set 112 may include only the number of error correction bits (k) used by the FEC code 122. In yet another configuration, the FEC parameter set 112 may additionally include an FEC coding rate for the FEC code 122. In some configurations, an FEC parameter set 112 may include a single FEC coding parameter. As used herein, the term FEC coding parameter may be used interchangeably with FEC parameter set 112.

Some flash controllers 104 may use an FEC code 122 with fixed FEC parameters (and a corresponding fixed number of bit errors that can be corrected before a write failure is declared). Therefore, conventional flash controllers 104 use one specific FEC parameter set 112 for the FEC code 122 for the lifetime of the flash memory 106. However, some FEC code 122 schemes may allow for easy adjustment of the FEC parameter sets 112, and more error-correcting FEC bits (or symbols) may be added to enhance the reliability of an error-prone page 120.

One of the limiting factors on the useful lifespan of flash memory 106 is the number of write operations performed to the flash memory 106 (e.g., memory wear). Eventually, portions of the flash memory 106 may break down and may unreliably store and read out data, at which point those portions of the flash memory 106 are no longer useful. Flash memory 106 may be organized by physical blocks or pages 120. The flash controller 104 may map the pages 120 to logical pages addressable by outside modules such as the operating system or user application. During a write operation, the flash controller 104 may write the FEC-coded data (e.g., the code words) to a particular page 120 within the flash memory 106, after which the written data is read to verify accuracy. If the data read out does not match the data written, after trying to correct any errors using the FEC code 122, a write failure is declared. At that point, flash controllers 104 using fixed FEC parameters may then mark the entire page 120 as corrupted and logically remap the flash memory 106 so that the corrupted page 120 is no longer used.

In contrast, the flash controller 104, in accordance with the systems and methods described herein, may use graceful degradation. Instead of marking an entire page 120 as bad or corrupt, the flash controller 104 may select a new FEC parameter set 112 that provides more redundancy than the current FEC parameter set 112. Therefore, the flash controller 104 may continue to utilize a portion of a corrupted page 120 in the flash memory 106 rather than marking the corrupted page 120 as bad and mapping to avoid reading and writing to the corrupted page 120. However, the increased redundancy associated with the new FEC parameter set 112 may come at the expense of reduced storage capacity of the page 120.

In one configuration, the flash controller 104 may include a dynamic FEC parameter selector 110 that selects a new FEC parameter set 112 in response to a write failure. For example, after the encoder 108 codes the source information bits using the FEC code 122 and a current FEC parameter set 112 to produce code words, the flash controller 104 may write the code words to a page 120 in the flash memory 106. The decoder 114 may retrieve the code words from the flash memory 106 and verify the accuracy of the data. In one configuration the decoder 114 may include an error checker 116, which checks the code words to detect errors. If the page 120 is corrupted and errors are detected, the dynamic FEC parameter selector 110 may select a new FEC parameter set 112 with more redundancy than the current FEC parameter set to provide more error-correcting capability. This may extend the lifespan of the flash memory 106 overall because a single write failure will not preclude an entire page 120 from being used.

In the configuration described above, the flash controller 104 may use one FEC code 122 scheme, but the flash controller 104 may be equipped with different FEC parameter sets 112. For example, an RS code may be used as the FEC code 122 with page 120 length n. Instead of using a fixed number of error correcting bits (k), each FEC parameter set 112 may have a higher value k. The error correcting bits (k) available for the FEC code 122 may be expressed as a set $K=\{k1, k2, \ldots, kN\}$, with $k1<k2<\ldots<kN$. A higher value k indicates higher error-correction capability and lower storage capacity. Therefore, at the beginning of the flash memory 106 life cycle, all pages 120 may start with an FEC parameter set 112 associated with k1, which provides the highest capacity and lowest error-correction capability. When the flash controller 104 encounters a write failure to a page 120, the flash controller 104 may switch the mode of that page 120 to a different FEC parameter set 112 (i.e., the FEC parameter set 112 associated with k2 or higher), hence providing more reliability but reduced storage capacity. It should be noted that in this configuration, FEC codes 122 other than an RS code can also be used.

Because an operating system may expect the same page size for read/write operations, the flash controller 104 may map multiple physically degraded pages 120 into a single logical page with an expected page size. As the capacity of a corrupted page 120 may be reduced due to increased redundancy associated with the new FEC parameter set 112, the usable data bytes of the corrupted page 120 may be less than the expected page size. For instance, the operating system may expect the page 120 to have 4096 bytes of usable data, but because of the increased redundancy, the usable data bytes of a corrupted page 120 may only be 2048 bytes. In one configuration, a mapping module 118 may map multiple corrupted pages 120 to a single logical page with the expected page 120 size. Such a logical page will use a higher coding level, and may be presented to the operating system as a "good" block with the same size of a normal page 120. For example, two corrupted pages 120 with 2048 usable data bytes may be mapped to a single logical page with the expected 4096 usable data bytes. Such an operation may hide the heterogeneity of the usable storage capacity of each page 120 from the operating system.

Figure 2:
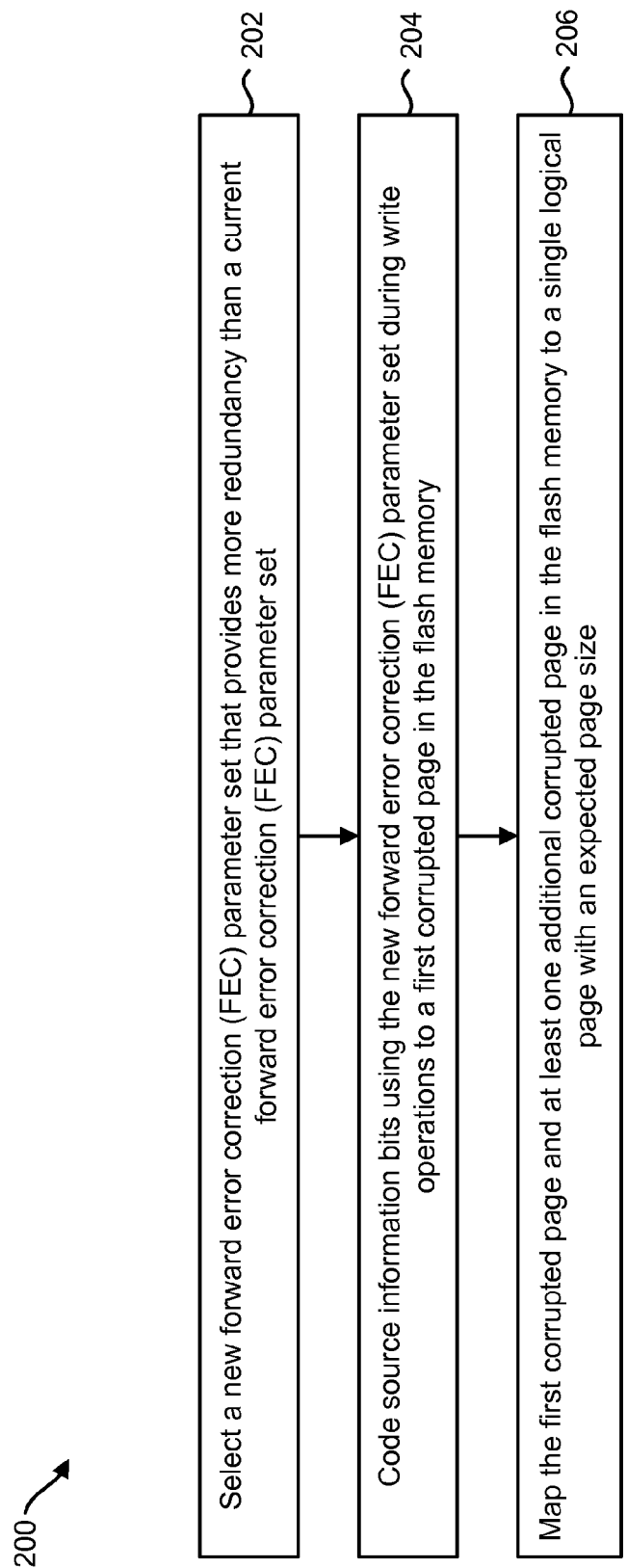
FIG. 2 is a flow diagram illustrating a method for controlling flash memory.

FIG. 2 is a flow diagram illustrating a method 200 for controlling flash memory 106. The method 200 may be performed by a flash controller 104. In some configurations, the flash controller 104 described in connection with FIG. 2 may be implemented in accordance with the flash controller 104 described in connection with FIG. 1.

In one configuration, the flash controller 104 may perform a write operation by encoding source information bits using a forward error correction (FEC) code 122 to produce stored code words. The flash controller 104 may encode the source information bits based on a current FEC parameter set 112. The flash controller 104 may write the stored code words to a first corrupted page 120 in the flash memory 106.

The flash controller 104 may read back the stored data to verify the accuracy of the stored data. If a write failure occurs, (e.g., the first corrupted page 120 is corrupted and write errors are detected), then the flash controller 104 may select 202 a new FEC parameter set 112 that provides more redundancy than the current FEC parameter set 112. The new FEC parameter set 112 may provide more error-correcting capability. In one configuration, the new FEC parameter set 112 may be selected from among multiple FEC parameter sets 112, with each FEC parameter set 112 providing different amounts of redundancy. The new FEC parameter set 112 may provide for a higher number of bit errors that can be corrected per page 120 than the current FEC parameter set 112. Therefore, the flash controller 104 may select a new FEC parameter set 112 that ensures sufficient redundancy to accurately store data to the first corrupted page 120, but does not introduce unnecessary redundancy that reduces the usable capacity of the first corrupted page 120.

The flash controller 104 may code 204 source information bits, using the new FEC parameter set 112, during write operations to the first corrupted page 120 in the flash memory 106. For example, the flash controller 104 may re-encode the source information bits using the FEC code 122 and the new FEC parameter set 112 to produce code words based on the new FEC parameter set 112. The flash controller 104 may write the code words to the first corrupted page 120 in the flash memory 106.

The flash controller 104 may map 206 the first corrupted page 120 and at least one additional corrupted page 120 to a single logical page with an expected page size. Because the operating system (or other user application) may expect a certain page size, the first corrupted page 120 and at least one additional corrupted page 120 may be combined (e.g., mapped) to form a single logical page with the expected page size. Therefore, the flash controller 104 may receive instructions (from the operating system, for example) and may read from and write data to the single logical page.

In some configurations, if the first corrupted page 120 and one or more additional corrupted pages 120 are mapped 206 together to form a single logical page, the flash controller 104 may store additional grouping information to the first corrupted page 120 and the one or more additional corrupted pages 120. The grouping information may be stored in the meta data of the first corrupted page 120 and the one or more additional corrupted pages 120. For example, the flash controller 104 may store the new FEC parameter set 112 used for each corrupted page 120. Because a new FEC parameter set 112 is determined separately for each corrupted page 120, the new FEC parameter set 112 used for the first corrupted page 120 may be different than the new FEC parameter sets 112 used for the additional corrupted pages 120.

The flash controller 104 may also store a mapping indicator to the first corrupted page 120 and the one or more additional corrupted pages 120. The mapping indicator may indicate the mapping from the first corrupted page 120 and the one or more additional corrupted pages 120 to the single logical page.

The flash controller 104 may additionally store order information to the first corrupted page 120 and the one or more additional corrupted pages 120. The order information may indicate the arrangement of data stored in the first corrupted page 120 and the one or more additional corrupted pages 120. For example, the flash controller 104 may store a first data segment to the first corrupted page 120 and may store additional data segments to the one or more additional corrupted pages 120. The order information may indicate the order of pages 120 when the flash controller 104 stores data to the single logical page to facilitate proper reconstruction of the data.

Figure 3:
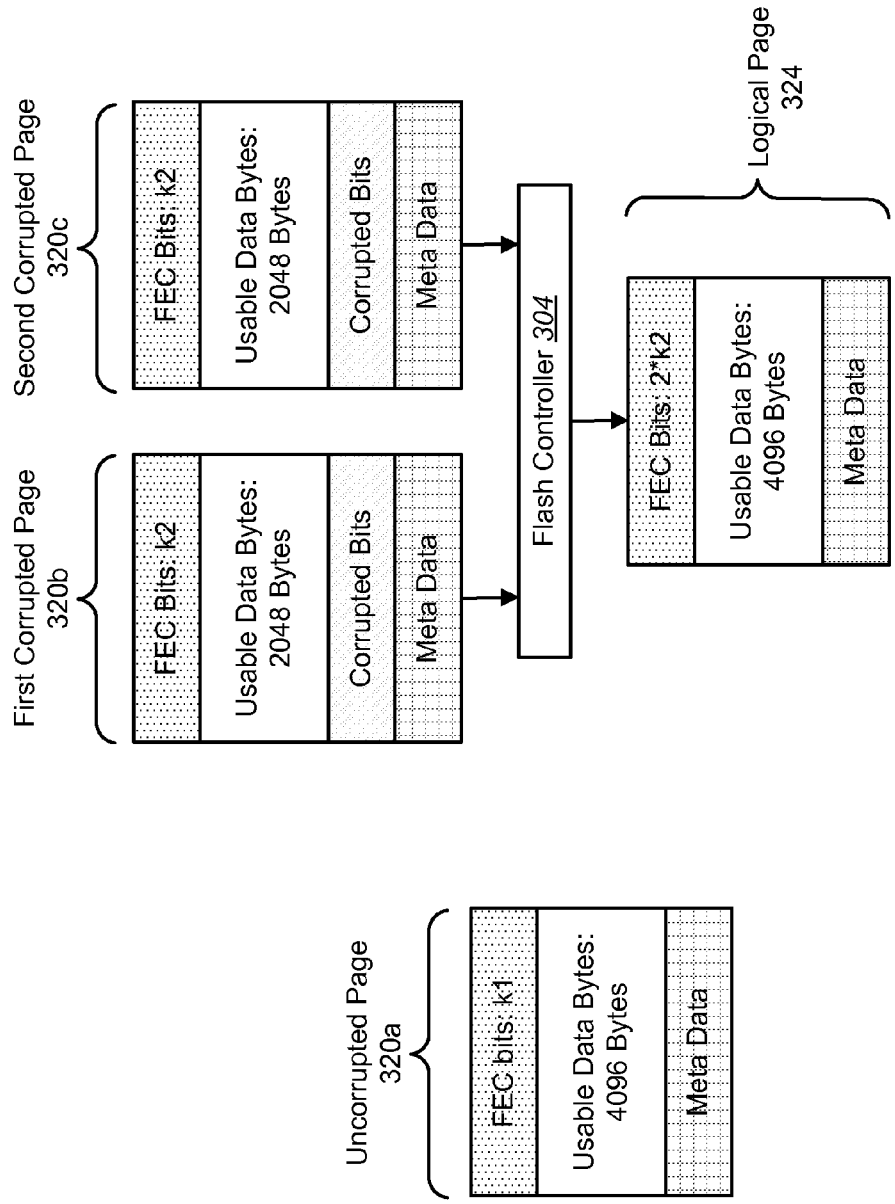
FIG. 3 is a block diagram illustrating an uncorrupted page and corrupted pages in flash memory.

FIG. 3 is a block diagram illustrating an uncorrupted page 320a and corrupted pages 320b-c in flash memory 106. The pages 320 may refer to specific blocks of memory. In some configurations, the flash memory 106 may be NAND flash memory, which may encounter write errors after repeated programming. Typically, each page 320 is programmed (e.g., written) individually and programming a page 320 involves setting selected bits from 1 to 0. Programming logic may further read out the programmed results to check if the programming was successful.

A raw page 320 may be divided into a data area and a spare area. The data area may include the usable data bytes. The spare area may include FEC bits and meta data. The user of the flash memory 106 (e.g. the operating system) may expect a certain data area size. From an external point of view, each page 320 may be a fixed size typically of a power of two bytes, such as 2048 or 2096 bytes. The spare area may be used to store FEC information (e.g., FEC bits) and other meta data. The spare area, may be a few tens of bytes (e.g. 64 bytes, 128 bytes, also typically of a power of two in size). However, the distinction between the usable data bytes, the FEC bits and meta data is superficial, as the raw bits in the flash memory 106 do not distinguish between what type of data is stored in a given bit in the flash memory 106.

The uncorrupted page 320a represents a normal page 320 in flash memory 106. The uncorrupted page 320a may include FEC bits, usable data bytes and meta data. The FEC bits may be used by a flash controller 304 in forward error correction (FEC). The amount of FEC bits may change depending on the FEC parameter set 112 used. For example, k1 may be less for an uncorrupted page 320a than a corrupted page 320 in which a write failure has been declared and an FEC parameter set 112 is selected that provides more redundancy.

The usable data bytes in the uncorrupted page 320a may be used to store data (e.g., source information bits). In the illustrated configuration, the expected size is 4096 bytes, but any suitable value may be used. However, the number of usable data bytes may vary. The usable data bytes in the uncorrupted page 320a may correspond to the page size expected by the operating system.

The meta data may include information about how the source information bits are stored in the uncorrupted page 320a. The meta data may include the FEC code 122 used to encode the source information bits, the FEC parameter set 112 selected for a particular page 320 and an indication of whether the page 320 is considered a corrupted page 320.

The first corrupted page 320b and the second corrupted page 320c each include corrupted bits. The corrupted bits may result in write errors. When a page 320 starts to encounter write errors, traditional flash management may rely on the FEC bits to correct those errors, i.e., once the number of byte errors in a page 320 increases to the extent that the existing FEC cannot be used to reliably correct the errors, the page 320 is considered bad and marked as abandoned.

However, instead of discarding the page 320 as a bad page 320, the flash controller 104 of the present systems and methods may use raw bit cells from the conventional data area (e.g., the usable data bytes) to store more FEC bits, and reduce the number of usable data bytes in the page 320. For example, a new FEC parameter set 112 may be selected that provides more redundancy than the current FEC parameter set 112. When a new FEC parameter set 112 is selected, fewer usable data bytes may be available because more redundancy is introduced during FEC coding. In this illustration, the number of usable data bytes for the corrupted pages 320b-c is 2048 bytes. It should be noted that the usable data bytes for multiple corrupted pages 320 may or may not be the same.

The first corrupted page 320b and the second corrupted page 320c may include FEC bits, usable data bytes and meta data. As with the uncorrupted page 320a, the FEC bits may be used by a flash controller 304 in forward error correction (FEC) for the corrupted pages 320b-c. However, with each corrupted page 320b-c, an FEC parameter set 112 may be selected that provides more redundancy. In this case, the number of FEC bits is k2, which is greater than the k1 FEC bits used for the uncorrupted page 320a.

The usable data bytes in the corrupted pages 320b-c may be less than the uncorrupted page 320a. This may be due to the corrupted bits that reduce the overall usable data bytes. Furthermore, the usable data bytes may decrease as the FEC bits increase. In other words, because more FEC bits are used to provide more redundancy to enhance the reliability of error-prone corrupted pages 320b-c, the usable data bytes will decrease.

The corrupted pages 320b-c may be combined to form one logical page 324 with the expected page size. The flash controller 304 may combine multiple corrupted pages 320b-c into one logical "good" page 324. In this way, a user application or operating system may be able to utilize the corrupted pages 320b-c. Therefore, the flash controller 304 hides the complexity from the user application and maintains interface consistency. Although FIG. 3 illustrates a configuration that combines two corrupted pages 320b-c, each with 50% of the expected usable data, any combination may be used that adds up to 100% of the expected usable data bytes. For example, 10 pages 320 with 10% of the expected usable data bytes may be grouped together. Similarly, four pages 320 with 25% of the expected usable data bytes each may be grouped, etc. Alternatively, the percentage of usable data bytes may not be the same for each corrupted page 320 grouped together into a single logical page 324. For instance, a page 320 with 30% capacity may be combined with a page 320 with 70% capacity.

It should be noted that the logical page 324 may have some of the same meta data as in an uncorrupted page 320a. For example, the meta data of the logical page 324 may indicate when a page was last written. But the logical page 324 may also include meta data to point to the multiple physical pages 320b-c that make up the logical page 324. From an interface point of view, the meta data that is presented to the operating system should not change whether the logical page 324 consists of one or multiple physical pages 320. However, additional meta data may be used to help the flash controller 304 in identifying the logical page 324 for physical page mapping.

The meta data for the corrupted pages 320b-c may include information about how the source information bits are stored in the corrupted pages 320b-c. The meta data may include the FEC code 122 used to encode the source information bits, the FEC parameter set 112 selected for a particular page 320 and an indication of whether the page 320 is considered a corrupted page 320b-c. The meta data may additionally include mapping information, which may include which pages 320b-c are grouped together, the order of the grouped pages 320b-c and logical page information (e.g., the logical page ID).

Figure 4:
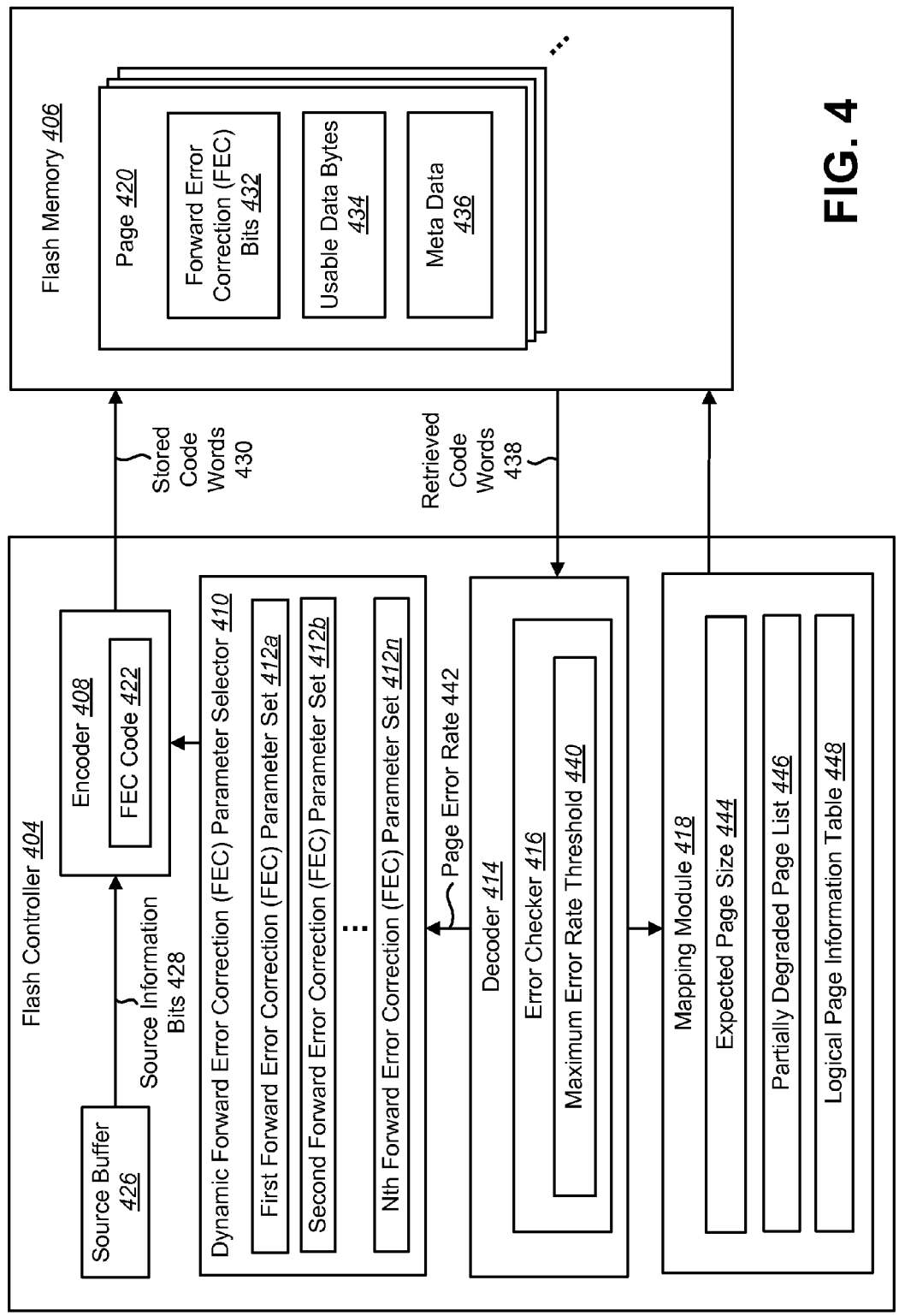
FIG. 4 is a block diagram illustrating a more detailed configuration of a flash controller for improving the reliability and lifespan of flash memory.

FIG. 4 is a block diagram illustrating a more detailed configuration of a flash controller 404 for improving the reliability and lifespan of flash memory 406. The flash controller 404 described in connection with FIG. 4 may be implemented in accordance with the flash controller 104 described in connection with FIG. 1. For example, the flash controller 404 may be included in an electronic device 102.

In some configurations, the flash controller 404 may include a source buffer 426, an encoder 408, a dynamic FEC parameter selector 410, a decoder 414 and a mapping module 418. The source buffer 426 may receive source information bits 428 to be saved in the flash memory 406. The source information bits 428 may originate from an operating system or user application. The encoder 408 may encode the source information bits using an FEC code 422. As described above in connection with FIG. 1, the FEC code 422 may be used to detect and correct data storage errors associated with the flash memory 406. The encoder 408 may encode the source information bits 428 using the FEC code 422 to produce stored code words 430.

During a write operation, the stored code words 430 may be stored (e.g., written) in a page 420 in the flash memory 406. For example, during the write operation, the FEC bits 432, usable data bytes 434 and meta data 436 may be written to the page 420. The stored code words 430 may be written to the usable data bytes 434. The FEC bits 432 may be redundant error-correcting bits added to the source information bits 428 by the FEC code 422. The meta data 436 may include the FEC code 422 used to encode the source information bits 428, the FEC parameter set 412 selected for the page 420 and an indication of whether the page 420 is considered a corrupted page 420.

Upon writing the stored code words 430, the flash controller 404 may retrieve and read the stored data to verify the accuracy of the stored data. For example, the decoder 414 may decode the retrieved code words 438. An error checker 416 may perform an FEC check to determine whether a write failure may have occurred. The error checker 416 may compare FEC bits 432 based on the FEC code 422 to obtain a page error rate 442. For example, the error checker 416 may detect write failures, and may estimate the page error rate 442 using the FEC code 422. It should be noted that the page error rate 442 may also be referred to as a bit error rate.

In one configuration, a specific type of linear FEC code 422 may produce FEC bits 432 (also referred to as parity check bits) in such a way that each FEC bit 432 can be computed based on a certain portion of the input bits (e.g., source information bits 428), e.g., the computation may involve an XOR operation of a subset of input bits at different positions. When performing a read operation, new FEC bits 432 may be re-computed based on input data bits and compared to the stored FEC bits 432 on the flash device. In this way, the number of differences in stored and new FEC bits 432 may be counted and this difference number may indicate the extent of the bit error rate (e.g., page error rate 442).

In some scenarios, a given page 420 of flash memory may include multiple FEC code words. Each code word may have its own parity check bits (e.g., FEC bits 432). Therefore, the total number of bit errors may be estimated by aggregating all bit errors from FEC code words within the page 420. The adaptation of the FEC coding parameters (e.g., the FEC parameter set 412) may occur even when the current page 420 can still be correctly decoded, but the estimated page error rate 442 is deemed too close to the un-decodable region. In this case, the flash controller 404 may proactively increase the redundancy by choosing a stronger FEC parameter set 412.

In another configuration, an FEC parameter set 412 adaptation may also take place after a read operation. For example, the flash controller 404 may perform a read operation where the estimated bit error rate in the page 420 (e.g., page error rate 442) is considered too high to be safe for continued use. In this case, the flash controller 404 may choose another FEC parameter set 412 for the current page 420. The flash controller 404 may additionally combine one or more degraded flash page(s) 420 with the current page 420 to form a logical page 324 and relocate certain portions of the data in the current page 420 to the combined logical page 324.

If the page error rate 442 is above a maximum error rate threshold 440, then the page 420 is determined to be too corrupted to reliably store data. The flash controller 404 may mark the corrupted page 420 as corrupted and logically remap the flash memory 406 so that the corrupted page 420 is no longer used. However, if the page error rate 442 is below the maximum error rate threshold 440, then the page 420 may still be reliably used if more redundancy is added to the FEC code 422.

The dynamic FEC parameter selector 410 may select an FEC parameter set 412 based on the page error rate 442. The dynamic FEC parameter selector 410 may include multiple FEC parameter sets 412a-n that may provide increasing redundancy to the FEC code 422. For example, at the beginning of the flash memory 406 life cycle, the page 420 may start with the first FEC parameter set 412a, which provides the highest capacity and lowest error-correction capability. Then, depending on the page error rate 442, the dynamic FEC parameter selector 410 may select a new FEC parameter set 412 that provides more redundancy than the first FEC parameter set 412a. The dynamic FEC parameter selector 410 may select a new FEC parameter set 412 that will provide reliable data storage based on the page error rate 442. The source information bits 428 may be encoded with the new FEC parameter set 412 and the stored code words 430 may be stored to the corrupted page 420 of the flash memory 406. The flash controller 404 may also store the new FEC parameter set 412 used to encode the source information bits to the meta data 436.

The mapping module 418 may combine multiple corrupted pages 420 into a single logical page 324. In one configuration, the operating system may require an expected page size 444. However, because the capacity of a corrupted page 420 may be reduced due to increased redundancy associated with the new FEC parameter set 412, the usable data bytes 434 of the corrupted page 420 may be less than the expected page size 444. For example, the expected page size 444 may be 4096 bytes, but due to degradation and the FEC operation, the usable data bytes 434 of the corrupted page 420 may only be 2048 bytes.

The mapping module 418 may map the corrupted page 420 with at least one additional corrupted page 420 in the flash memory 406 to a single logical page 324 with the expected page size 444. In one configuration, the mapping module 418 may include a partially degraded page list 446, which may be populated with entries associated with the corrupted pages 420 as the error checker 416 detects an estimated error rate that is higher than an FEC threshold for the error rate of the current FEC parameter set 412. The partially degraded page list 446 may also include information about the usable data bytes 434 for a corrupted page 420. The mapping module 418 may also include a logical page information table 448, which may include a logical page ID and the address of each corrupted page 420 that is mapped to a particular logical page 324.

Figure 5:
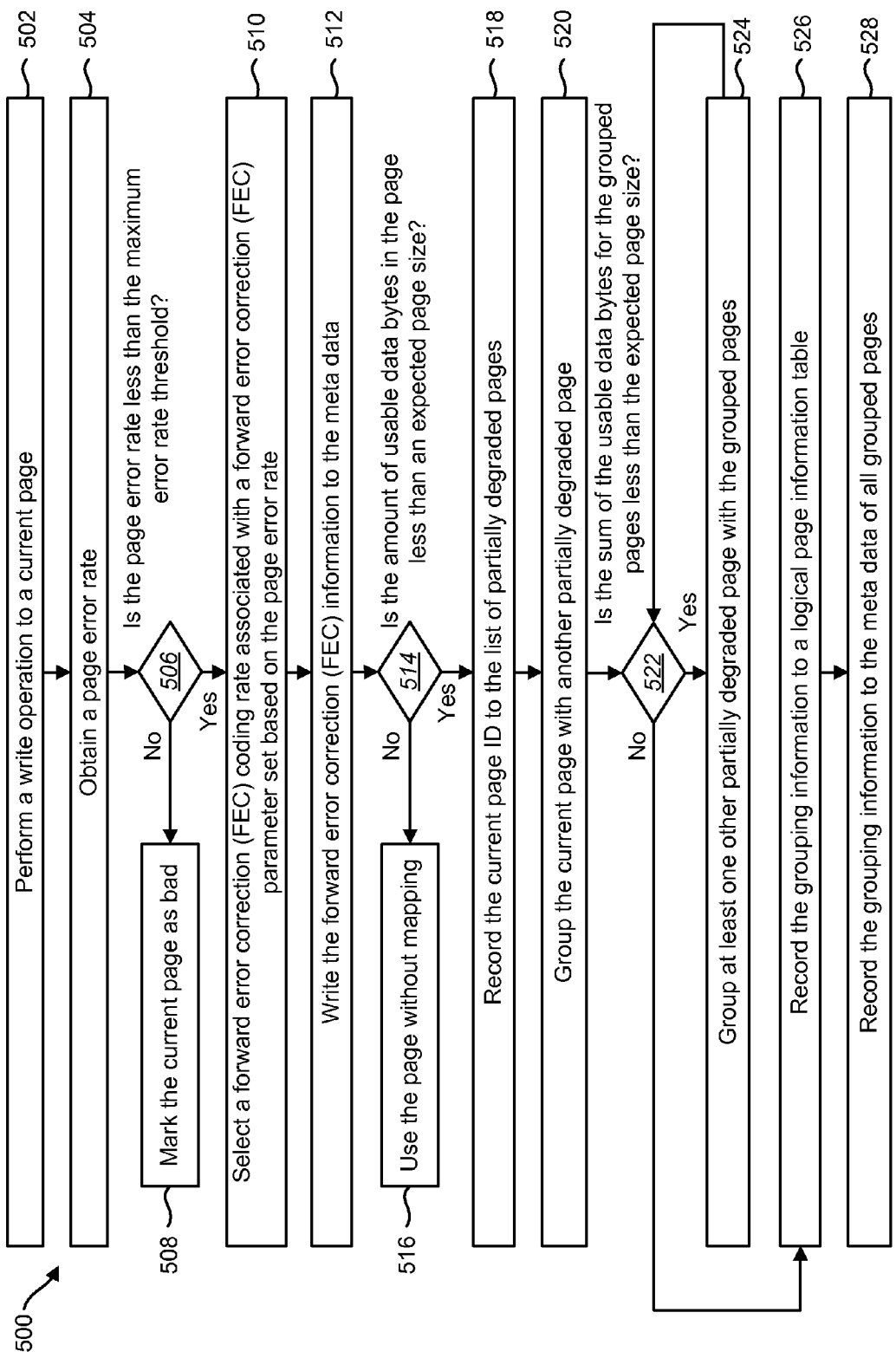
FIG. 5 is a flow diagram illustrating a method for writing data to flash memory.

FIG. 5 is a flow diagram illustrating a method 500 for writing data to flash memory 406. The method 500 may be performed by a flash controller 404. The flash controller 404 may perform 502 a write operation to a current page 420. For example, the flash controller 404 may encode source information bits 428 using a forward error correction (FEC) code 422 to produce stored code words 430. The flash controller 404 may encode the source information bits 428 with FEC bits 432 based on a current FEC parameter set 412. The flash controller 404 may write the encoded source information bits 428 (e.g., the stored code words 430) to the current page 420 in the flash memory 406.

The flash controller 404 may obtain 504 a page error rate 442. Upon writing content (e.g., stored code words 430) to the current page 420, the flash controller 404 may obtain 504 the page error rate 442 by reading back the content (e.g., the retrieved code words 438) and may perform error rate estimation using the FEC code 422. In one configuration, the flash controller 404 may compare the stored FEC bits 432 and newly computed FEC bits (obtained from data bits stored in the usable data bytes 434) based on the FEC code 422 to obtain 504 the page error rate 442. The flash controller 404 may compare 506 the estimated bit error rate of the page 420 (e.g., page error rate 442) to a set of pre-determined FEC thresholds associated with the FEC parameter sets 412. For example, if the estimated page error rate 442 is less than 1%, the first FEC coding parameter (e.g., first FEC parameter set 412a) with least redundancy will be used; if the estimated page error rate 442 is more than 1% but less than 2%, the second FEC coding parameter (e.g., second FEC parameter set 412b) will be used; etc. And finally, if the estimated page error rate 442 is greater than a maximum error rate threshold 440, the flash controller 404 may mark 508 the current page 420 as bad and the current page 420 will no longer be used. In one configuration, the maximum error rate threshold 440 may be a 10% estimated bit error rate. However, if the page error rate 442 is less than the maximum error rate threshold 440, the current page 420 may still be used.

If the flash controller 404 determines 506 that the page error rate 442 is less than the maximum error rate threshold 440, then the flash controller 404 may select 510 an FEC coding rate associated with an FEC parameter set 412 based on the page error rate 442. The FEC coding rate corresponding to a given page error rate 442 is designed such that the flash controller 404 can almost guarantee successful decoding even with more errors. In one configuration, this may be accomplished by adding more redundancy during encoding (e.g., adding more FEC bits 432 to the source information bits 428). The flash controller 404 may write 512 the FEC information to the meta data 436 of the current page 420. The FEC information may include the FEC code 422 used and the selected FEC parameter set 412 (including the FEC coding rate).

After the FEC parameter set 412 (e.g., the FEC coding parameter) is determined using the estimated page error rate 442 (e.g., bit error rate of the page 420), the flash controller 404 may determine 514 if the amount of usable data bytes 434 in the page 420 is less than an expected page size 444. If the amount of usable data bytes 434 in the page 420 is greater than or equal to an expected page size 444, then the page 420 capacity (e.g., the usable data bytes 434) conforms to the expectations of the operating system. Therefore, the flash controller 404 may use 516 the page 420 without mapping with other pages 420. However, if the flash controller 404 determines 514 that the number of usable data bytes 434 in the page 420 is less than the expected page size 444 (including the FEC bits 432), then the flash controller 404 may group (e.g., map) the page 420 with one or more partially degraded pages 420.

The flash controller 404 may record 518 the page ID to a partially degraded page list 446. The page ID may be an address or other unique identifier of the current page 420 in the flash memory 406. The partially degraded page list 446 may be sorted by the number of usable data bytes 434 associated with each page 420 in the partially degraded page list 446.

The flash controller 404 may group 520 the current page 420 with another partially degraded page 420. In one configuration, the flash controller 404 may search for another partially degraded page 420 to group 520 with the current page 420, where the sum of usable data bytes 434 exceeds the expected page size 444 by the least amount. For example, the flash controller 104 may search the partially degraded page list 446 for another partially degraded page 420 to group 520 with the current page 420. If the flash controller 404 determines 522 that the sum of the usable data bytes 434 is less than the expected page size 444, then the flash controller 404 may group 524 at least one other partially degraded page 420 with the grouped pages 420. In one configuration, the flash controller 404 may add a single additional partially degraded page 420 to the group. In another configuration, the flash controller 404 may add pairs of partially degraded pages 420 to the group. In yet another configuration, the flash controller 404 may add partially degraded pages 420 in a power of two (e.g., the group may include 2, 4, 8, 16, etc. partially degraded pages 420).

If the sum of the usable data bytes 434 for the grouped pages 420 is greater than or equal to the expected page size 444, then the flash controller 404 may record 526 the grouping information in a logical page information table 448. The grouped pages 420 may be combined into a single logical page 324, which may be presented to the operating system as a block with the expected page size 444. Therefore, each entry in the logical page information table 448 may be for a separate logical page 324 and may include a logical page ID and the address of each of the physical pages 420 that are mapped together to form the logical page 324.

The flash controller 404 may record 528 the grouping information to the meta data 436 of all grouped pages 420. The flash controller 404 may record 528 to all physical pages 420 forming the logical page 324 the same logical page number, a sub-page number that indicates the order of the physical page 420 in the group, the address of the next sub-page in the group and the number of stored data bytes in the current physical page 420. This grouping information, along with the FEC information, may be written in the spare area (e.g., the meta data 436) of the page 420.

Figure 6:
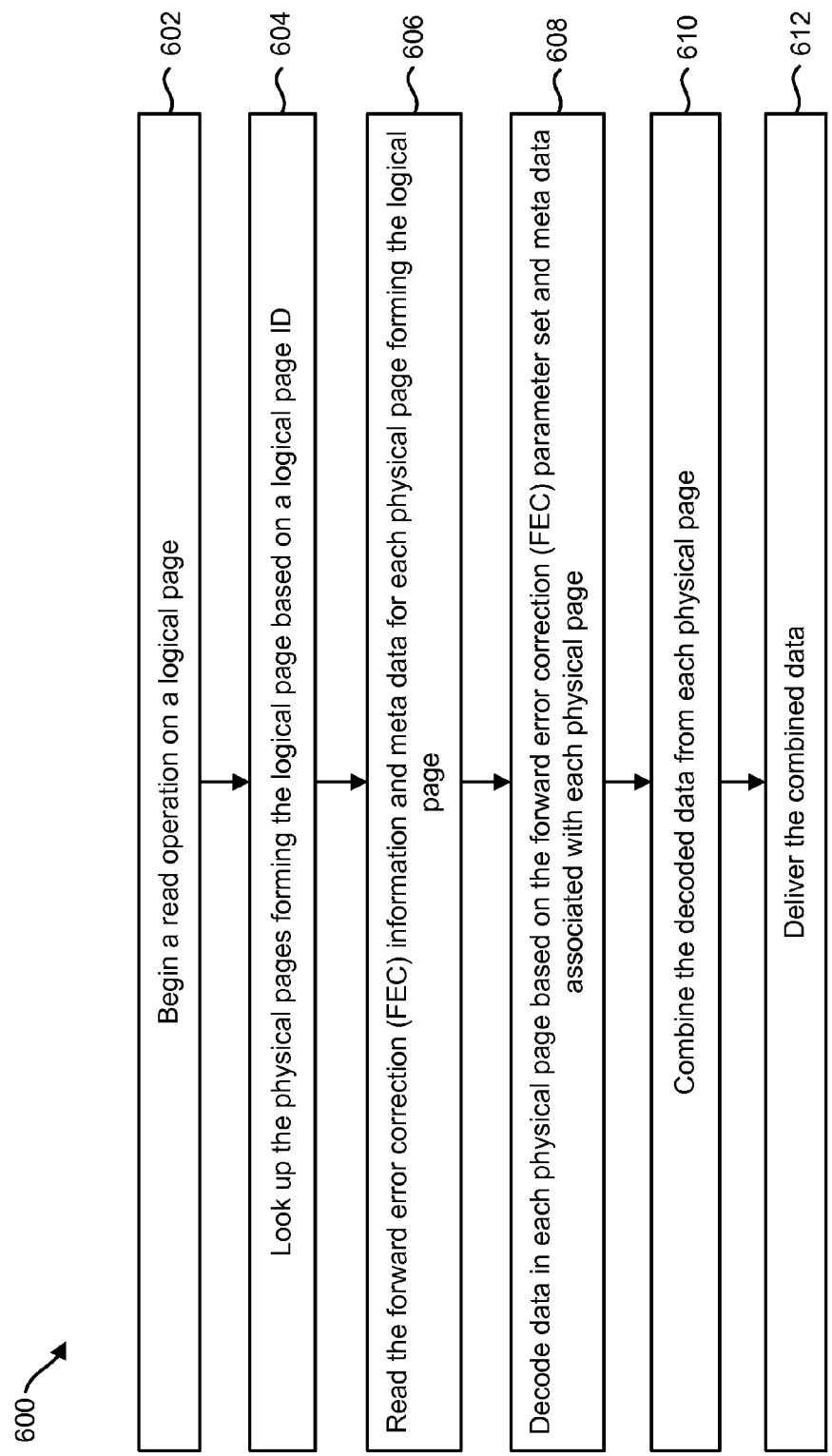
FIG. 6 is a flow diagram illustrating a method for reading data from a logical page.

FIG. 6 is a flow diagram illustrating a method 600 for reading data from a logical page 324. The method 600 may be performed by a flash controller 404. The flash controller 404 may begin 602 a read operation on a logical page 324. The read operation may be initiated when the flash controller 404 receives a request (from the operating system, for example) for data stored in the logical page 324. The logical page 324 may include multiple partially degraded pages 420 that are mapped together to form the logical page 324 as described above in connection with FIG. 5.

The flash controller 404 may look up 604 the physical pages 420 forming the logical page 324 based on a logical page ID. For example, the flash controller 404 may include a logical page information table 448 that includes entries for each logical page 324. The entries in the logical page information table 448 may include a logical page ID and the address of each of the physical pages 420 that are combined to form the logical page 324. By looking up 604 the logical page ID in the logical page information table 448, the flash controller 404 may determine which physical pages 420 in the flash memory 406 form the logical page 324.

The flash controller 404 may read 606 the FEC information and meta data 436 for each physical page 420 forming the logical page 324. The FEC information may include the FEC code 422 and the selected FEC parameter set 412 (including the FEC coding rate) used to encode the source information bits 428. It should be noted that according to the systems and methods described herein, the FEC parameter set 412 that is selected may vary depending on how much a page 420 is corrupted. Therefore, each of the physical pages 420 that form the logical page 324 may have the same or different FEC parameter sets 412. The meta data 436 may include grouping information such as the logical page number, a sub-page number that indicates the order of the physical page 420 in the group, the address of the next sub-page in the group and the number of stored data bytes in the current physical page 420.

The flash controller 404 may decode 608 data in each physical page 420 based on the FEC information and meta data 436 associated with each physical page 420. The FEC information and meta data 436 stored in a page 420 may indicate to the flash controller 404 how to decode 608 the data stored in the page 420. For example, the flash controller 404 may apply the FEC parameter set 412 to the FEC code 422 to correctly decode 608 the data in each physical page 420.

The flash controller 404 may combine 610 the decoded data from each physical page 420. In one configuration, the flash controller 404 may combine 610 the decoded data based on the grouping information included in the meta data 436. For example, the grouping information may indicate the arrangement of data stored in the grouped pages 420. Therefore, the grouping information may allow the flash controller 404 to reconstruct the source information bits 428 from the decoded data from each physical page 420. Upon combining 610 the decoded data, the flash controller 404 may deliver 612 the combined data. The flash controller 404 may deliver 612 the combined data to the operating system or user application that made the request for the stored data.

Figure 7:
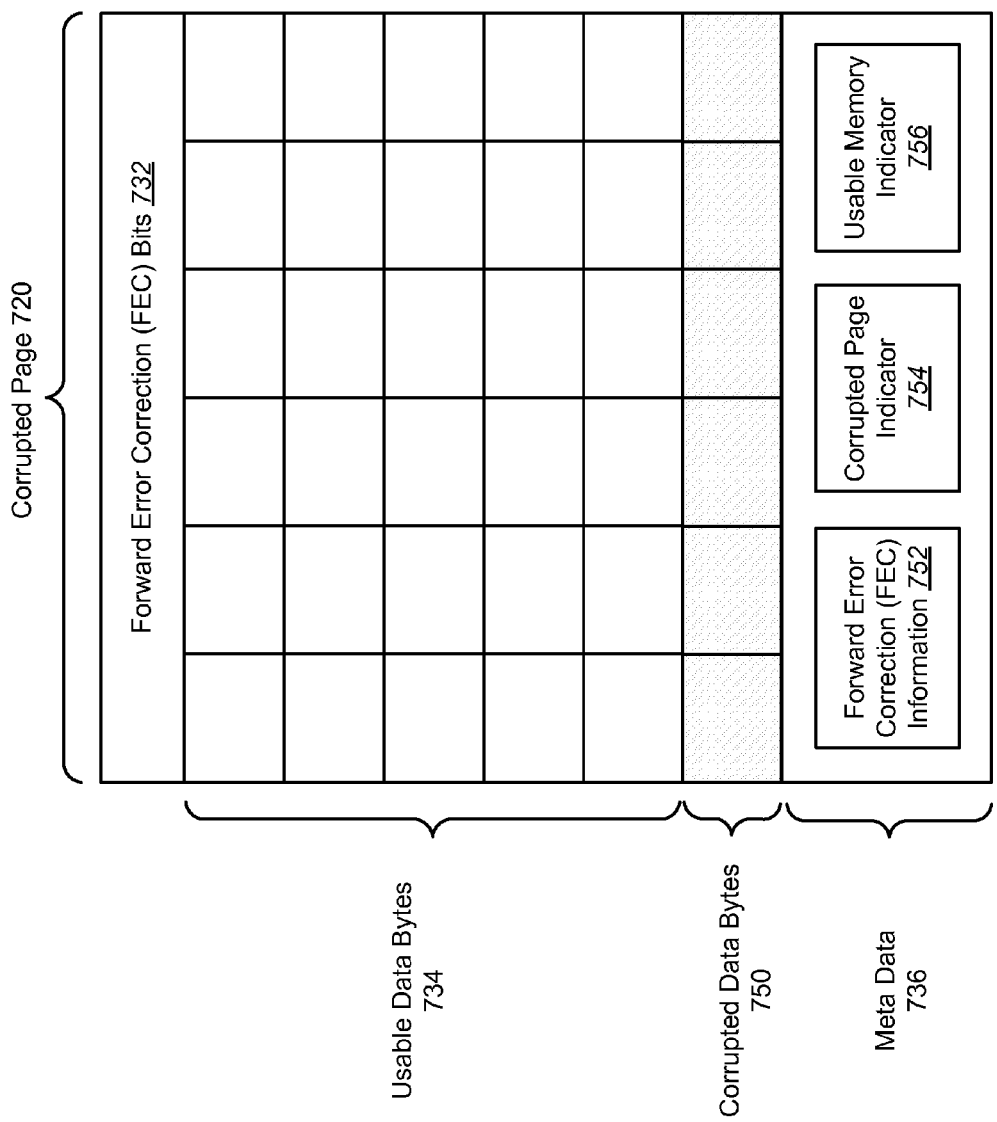
FIG. 7 is a block diagram illustrating another configuration of a corrupted page in flash memory.

FIG. 7 is a block diagram illustrating another configuration of a corrupted page 720 in flash memory 106. The corrupted page 720 may include FEC bits 732, usable data bytes 734, meta data 736 and corrupted data bytes 750. The FEC bits 732 may be used by a flash controller 104 in forward error correction (FEC). The amount of FEC bits 732 may change depending on the FEC parameter set 112 used.

The usable data bytes 734 in the corrupted page 720 may be used to store data (e.g., source information bits 428). The number of usable data bytes 734 may vary. For example, the corrupted data bytes 750 and the FEC bits 732 may reduce the number of usable data bytes 734.

The meta data 736 may include information about how the data is stored in the corrupted page 720. As described above, the meta data 736 may include the FEC information 752, which indicates the FEC code 122 used to encode the source information bits 428 and the FEC parameter set 112 selected for the page 720. The meta data 736 may also include a corrupted page indicator 754 that may indicate whether the page 720 is considered a corrupted page 720.

The meta data 736 may further include a usable memory indicator 756 that indicates the amount of usable data bytes 734 and corrupted data bytes 750 of the page 720. In one configuration, the usable memory indicator 756 may express the amount of usable data bytes 734 and corrupted data bytes 750 as a number. For example, the usable data bytes 734 may be expressed as X bytes and the corrupted data bytes 750 may be expressed as Y bytes. In another configuration, the usable memory indicator 756 may express the amount of usable data bytes 734 and corrupted data bytes 750 as a percentage (or ratio) of usable memory. For example, the usable data bytes 734 may be divided by the total capacity of the corrupted page 720 to obtain a percentage of usable memory. Alternatively, the corrupted data bytes 750 may be divided by the usable data bytes 734 to obtain a ratio corrupted and usable memory. In another configuration, the usable memory indicator 756 may be stored in the flash controller 104 instead of the corrupted page 720.

The usable memory indicator 756 may be determined based on the FEC coding parameter (e.g., FEC parameter set 412) and the total number of usable data bytes 434 in the page 420. The FEC coding parameter may be determined based on the estimated page error rate 442. For example, when the flash controller 404 reads back stored data to verify the accuracy of the stored data, the flash controller 404 may compare FEC bits 732 based on the FEC code 422 to obtain the estimated page error rate 442. The flash controller 404 may then determine the FEC coding parameter based on the estimated page error rate 442 and a set of pre-determined FEC thresholds that maps a given coding error rate (e.g., page error rate 442) to a particular FEC coding parameter. Based on the FEC coding parameter and the total bits available in the page 420 (including both data bits 434 and FEC bits 432), the flash controller 404 may then determine the number of usable data bytes 734.

It should be noted that there is no need to distinguish specific bits as corrupted or usable. Because the read/write operations are based on FEC, the flash controller 104 may only need to know if the estimated bit errors are correctable or not by the chosen FEC code 122. If the bit errors are correctable, the read results after decoding will be correct. In this process, some headroom may be budgeted so that the chosen FEC code 122 will not only correct the existing error bits in the page, but also handle more error bits in the future.

Figure 8:
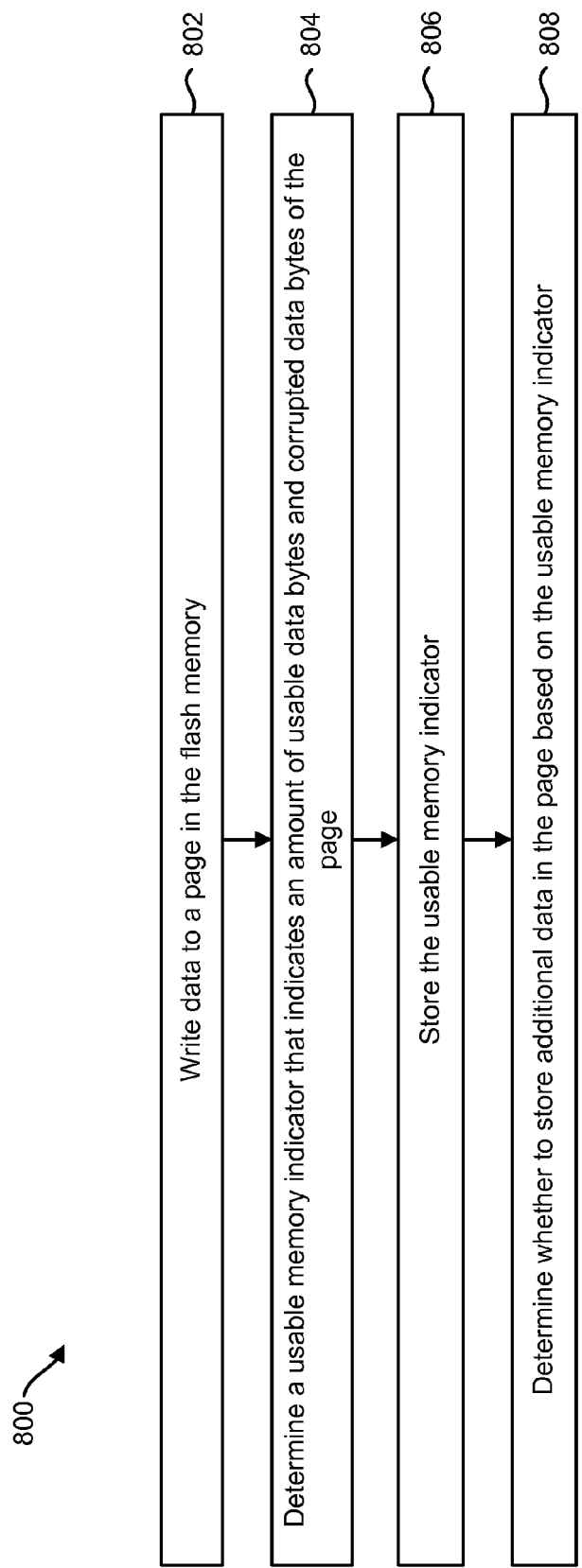
FIG. 8 is a flow diagram illustrating another method for controlling flash memory.

FIG. 8 is a flow diagram illustrating another method 800 for controlling flash memory 106. The method 800 may be performed by a flash controller 104. In some configurations, the flash controller 104 described in connection with FIG. 8 may be implemented in accordance with the flash controller 104 described in connection with FIG. 1. For example, the flash controller 104 may encode source information bits 428 using an FEC code 122 and a selected FEC parameter set 112.

The flash controller 104 may write 802 data to a page 120 in the flash memory 106. This may be done as described in connection with FIG. 1.

The flash controller 104 may determine 804 a usable memory indicator 756 that indicates an amount of usable data bytes 434 and corrupted data bytes 750. For example, when the flash controller 104 reads back stored data to verify the accuracy of the stored data, the flash controller 104 may compare FEC bits 432 based on the FEC code 122 to obtain the page error rate 442. The flash controller 104 may determine the amount of usable data bytes 434 and the corrupted data bytes 750 based on the page error rate 442. This may be accomplished as described above in connection with FIG. 7. For example, when the flash controller 104 reads back stored data to verify the accuracy of the stored data, the flash controller 104 may compare FEC bits 432 based on the FEC code 122 to obtain the estimated page error rate 442. The flash controller 104 may then determine the FEC coding parameter based on the estimated page error rate 442 and a set of pre-determined FEC thresholds that maps a given coding error rate (e.g., page error rate 442) to a particular FEC coding parameter. Based on the FEC coding parameter and the total bits available in the page 420 (including both data bits 434 and FEC bits 432), the flash controller 404 may then determine the number of usable data bytes 434.

The flash controller 104 may store 806 the usable memory indicator 756. In one configuration, the usable memory indicator 756 may be stored in the meta data 736 of the page 720 as described above in connection with FIG. 7. In another configuration, the usable memory indicator 756 may be stored in a list or table located in the flash controller 104. For example, the flash controller 104 may store a list of pages 120 in the flash memory 406. The flash controller 104 may also store the usable memory indicator 756 associated with a particular page 120 in the list of pages 120. If the flash controller 104 performs subsequent write operations, the flash controller 104 may again determine the usable memory indicator 756 and may update the stored value of the usable memory indicator 756. Additionally or alternatively, if the flash controller 104 performs subsequent read operations from the page 120, the flash controller 104 may again determine the usable memory indicator 756 and may update the stored value of the usable memory indicator 756. For example, upon performing a subsequent write operation or subsequent read operation, the flash controller 104 may estimate a page error rate 442 based on the write or read operation. The flash controller 104 may update the stored value of the usable memory indicator 756 based on the page error rate 442.

The flash controller 104 may determine 808 whether to store additional data in the page 120 based on the usable memory indicator 756. In this way, the flash controller 104 may quickly determine 808 whether to use a page 120 to store additional data. In one configuration, when performing a write operation, the flash controller 104 may first look up the usable memory indicator 756 to determine whether the page 120 has an expected page size 444. If the number of usable data bytes 434 of the page 120 is less than the expected page size 444, then the flash controller 104 may not use the page 120 without mapping the page 120 with other partially degraded pages as described above.

In another configuration, the usable memory indicator 756 may indicate that the usable capacity (e.g., the usable data bytes 434) of the page 120 is less than the expected page size 444, but the flash controller 104 may store additional data to the page 120 if the usable capacity is sufficient to store the additional data. Therefore, the flash controller 104 may store data to a corrupted page 120 if the data is less than the usable capacity indicated by the usable memory indicator 756, despite the corrupted page 120 having less than the expected page size 444 for the operating system. This may include using a software interface between the operating system and the hardware controller, and passing information regarding the file to be stored from the operating system to the flash controller 104. In one configuration, the information passed may be the actual size of the file used by the application software and recognized by the operating system.

Figure 9:
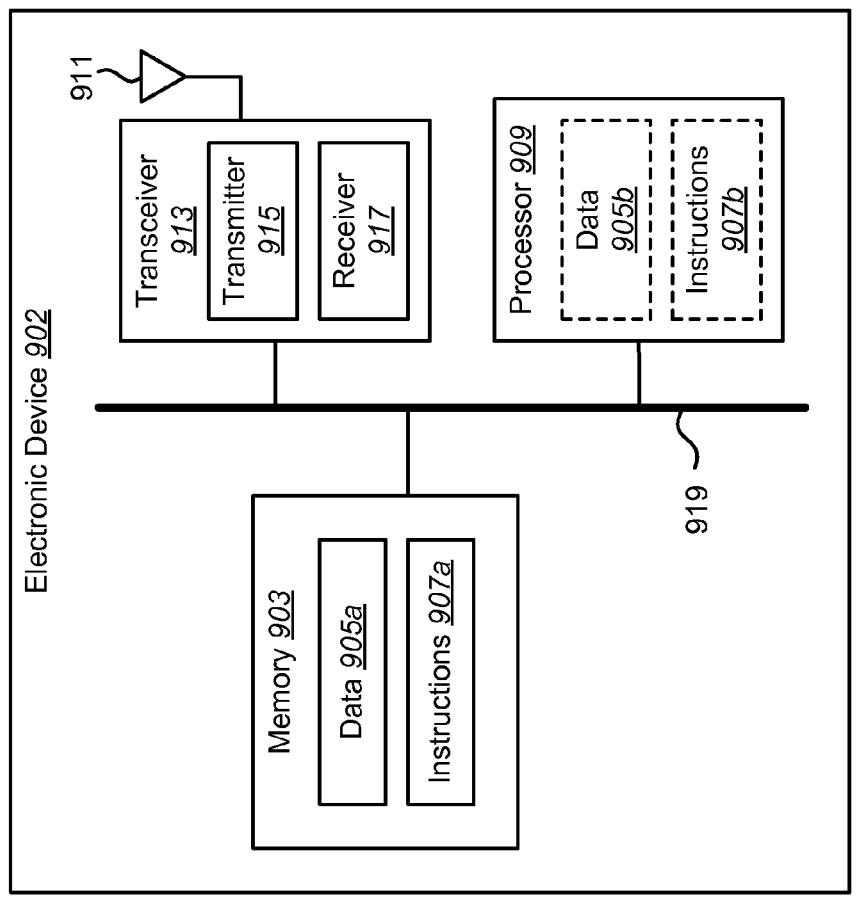
FIG. 9 illustrates certain components that may be included within an electronic device.

FIG. 9 illustrates certain components that may be included within an electronic device 902. The electronic device 902 may be implemented in accordance with one or more of the electronic devices 102 described above. The electronic device 902 includes a processor 909. The processor 909 may be a general purpose single- or multi-chip microprocessor (e.g., an ARM), a special purpose microprocessor (e.g., a digital signal processor (DSP)), a microcontroller, a programmable gate array, etc. The processor 909 may be referred to as a central processing unit (CPU). Although just a single processor 909 is shown in the electronic device 902 of FIG. 9, in an alternative configuration, a combination of processors (e.g., an ARM and DSP) could be used.

The electronic device 902 also includes memory 903 in electronic communication with the processor 909 (i.e., the processor 909 can read information from and/or write information to the memory 903). The memory 903 may be any electronic component capable of storing electronic information. The memory 903 may be random access memory (RAM), read-only memory (ROM), magnetic disk storage media, optical storage media, flash memory devices in RAM, on-board memory included with the processor, programmable read-only memory (PROM), erasable programmable read-only memory (EPROM), electrically erasable PROM (EEPROM), registers, and so forth, including combinations thereof.

Data 905a and instructions 907a may be stored in the memory 903. The instructions 907a may include one or more programs, routines, sub-routines, functions, procedures, etc. The instructions 907a may include a single computer-readable statement or many computer-readable statements. The instructions 907a may be executable by the processor 909 to implement one or more of the methods that were described above. Executing the instructions 907a may involve the use of the data 905a that is stored in the memory 903. FIG. 9 shows some instructions 907b and data 905b being loaded into the processor 909.

The electronic device 902 may also include a transmitter 915 and a receiver 917 to allow transmission and reception of signals between the electronic device 902 and a remote location (e.g., a base station or other electronic device). The transmitter 915 and receiver 917 may be collectively referred to as a transceiver 913. An antenna 911 may be electrically coupled to the transceiver 913. The electronic device 902 may also include (not shown) multiple transmitters, multiple receivers, multiple transceivers and/or multiple antenna.

The various components of the electronic device 902 may be coupled together by one or more buses, which may include a power bus, a control signal bus, a status signal bus, a data bus, etc. For simplicity, the various buses are illustrated in FIG. 9 as a bus system 919.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "couple" and any variations thereof may indicate a direct or indirect connection between elements. For example, a first element coupled to a second element may be directly connected to the second element, or indirectly connected to the second element through another element.

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a digital signal processor (DSP) and a microprocessor, a plurality of microprocessors, one or more microprocessors in conjunction with a digital signal processor (DSP) core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement (s). For example, the terms "instructions" and "code" may refer to one or more programs, routines, sub-routines, functions, procedures, etc. "Instructions" and "code" may comprise a single computer-readable statement or many computer-readable statements.

The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for controlling a flash memory, comprising:
   selecting a new forward error correction (FEC) parameter set that provides more redundancy than a current FEC parameter set;
   coding source information bits, using the new FEC parameter set, during write operations to a first corrupted page in the flash memory; and
   mapping the first corrupted page and at least one additional corrupted page in the flash memory to a single logical page with an expected page size.

2. The method of claim 1, wherein the selecting is performed in response to a write failure to the first corrupted page or when an estimated page error rate exceeds an FEC threshold during reading operations from the first corrupted page.

3. The method of claim 1, wherein the selecting comprises selecting the new FEC parameter set from among multiple FEC parameter sets, each providing different amounts of redundancy.

4. The method of claim 1, wherein the new FEC parameter set has a higher number of bit errors that can be corrected per page than the current FEC parameter set.

5. The method of claim 1, further comprising storing the new FEC parameter set in the first corrupted page and another FEC parameter set in the at least one additional corrupted page.

6. The method of claim 1, further comprising storing, in the first corrupted page and the at least one additional corrupted page, a mapping indicator that indicates the mapping from the first corrupted page and the at least one additional corrupted page to the single logical page.

7. The method of claim 1, further comprising storing, in the first corrupted page and the at least one additional corrupted page, order information indicating an arrangement of data stored in the first corrupted page and the at least one additional corrupted page.

8. The method of claim 1, further comprising reading and writing data to the single logical page based on received instructions.

9. The method of claim 1, further comprising:
   recording the first corrupted page to a partially degraded page list;
   searching the partially degraded page list for the at least one additional corrupted page;
   determining that a sum of usable data bytes of the first corrupted page and the at least one additional corrupted page is greater than or equal to the expected page size;
   recording grouping information in a logical page information table; and
   recording the grouping information to meta data of the first corrupted page and the at least one additional corrupted page.

10. The method of claim 1, further comprising maintaining interface consistency for the single logical page.

11. The method of claim 1, further comprising estimating a page error rate, and wherein selecting the new FEC parameter set is based on the page error rate.

12. An electronic device for controlling a flash memory, comprising:
    a processor;
    flash memory in electronic communication with the processor; and
    instructions stored in the memory, the instructions being executable by the processor to:
       select a new forward error correction (FEC) parameter set that provides more redundancy than a current FEC parameter set;
       code source information bits, using the new FEC parameter set, during write operations to a first corrupted page in the flash memory; and
       map the first corrupted page and at least one additional corrupted page in the flash memory to a single logical page with an expected page size.

13. The electronic device of claim 12, wherein the instructions to select comprise instructions to select in response to a write failure to the first corrupted page or when an estimated page error rate exceeds an FEC threshold during reading operations from the first corrupted page.

14. The electronic device of claim 12, wherein the instructions to select comprise instructions executable to select the new FEC parameter set from among multiple FEC parameter sets, each providing different amounts of redundancy.

15. The electronic device of claim 12, wherein the new FEC parameter set has a higher number of bit errors that can be corrected per page than the current FEC parameter set.

16. The electronic device of claim 12, further comprising instructions executable to store the new FEC parameter set in the first corrupted page and another FEC parameter set in the at least one additional corrupted page.

17. The electronic device of claim 12, further comprising instructions executable to store, in the first corrupted page and the at least one additional corrupted page, a mapping indicator that indicates mapping from the first corrupted page and the at least one additional corrupted page to the single logical page.

18. The electronic device of claim 12, further comprising instructions executable to store, in the first corrupted page and the at least one additional corrupted page, order information indicating an arrangement of data stored in the first corrupted page and the at least one additional corrupted page.

19. The electronic device of claim 12, further comprising instructions executable to read and write data to the single logical page based on received instructions.

20. The electronic device of claim 12, further comprising instructions executable to:
    record the first corrupted page to a partially degraded page list;
    search the partially degraded page list for the at least one additional corrupted page;
    determine that a sum of usable data bytes of the first corrupted page and the at least one additional corrupted page is greater than or equal to the expected page size;
    record grouping information in a logical page information table; and
    record the grouping information to meta data of the first corrupted page and the at least one additional corrupted page.

21. The electronic device of claim 12, further comprising instructions executable to maintain interface consistency for the single logical page.

22. The electronic device of claim 12, further comprising instructions executable to estimate a page error rate, and wherein selecting the new FEC parameter set is based on the page error rate.

23. A computer-program product for controlling a flash memory, comprising a non-transitory tangible computer-readable medium having instructions thereon, the instructions comprising:
  code for causing an electronic device to select a new forward error correction (FEC) parameter set that provides more redundancy than a current FEC parameter set;
  code for causing the electronic device to code source information bits, using the new FEC parameter set, during write operations to a first corrupted page in the flash memory; and
  code for causing the electronic device to code map the first corrupted page and at least one additional corrupted page in the flash memory to a single logical page with an expected page size.

24. The computer-program product of claim 23, wherein the code for causing the electronic device to select executes in response to a write failure to the first corrupted page or when an estimated page error rate exceeds an FEC threshold during reading operations from the first corrupted page.

25. The computer-program product of claim 23, wherein the code for causing the electronic device to select comprises code for causing the electronic device to select the new FEC parameter set from among multiple FEC parameter sets, each providing different amounts of redundancy.

26. The computer-program product of claim 23, further comprising code for causing the electronic device to store the new FEC parameter set in the first corrupted page and another FEC parameter set in the at least one additional corrupted page.

27. The computer-program product of claim 23, further comprising code for causing the electronic device to read and write data to the single logical page based on received instructions.

28. An electronic device for controlling a flash memory, comprising:
  circuitry configured to select a new forward error correction (FEC) parameter set that provides more redundancy than a current FEC parameter set, to code source information bits, using the new FEC parameter set, during write operations to a first corrupted page in the flash memory, and to map the first corrupted page and at least one additional corrupted page in the flash memory to a single logical page with an expected page size.

29. The electronic device of claim 28, wherein the circuitry configured to select is configured to select in response to a write failure to the first corrupted page or when an estimated page error rate exceeds an FEC threshold during reading operations from the first corrupted page.

30. The electronic device of claim 28, wherein the circuitry configured to select comprises circuitry configured to select the new FEC parameter set from among multiple FEC parameter sets, each providing different amounts of redundancy.

31. The electronic device of claim 28, further comprising circuitry configured to store the new FEC parameter set in the first corrupted page and another FEC parameter set in the at least one additional corrupted page.

32. The electronic device of claim 28, further comprising circuitry configured to read and write data to the single logical page based on received instructions.

33. An apparatus for controlling a flash memory, comprising:
  means for selecting a new forward error correction (FEC) parameter set that provides more redundancy than a current FEC parameter set;
  means for coding source information bits, using the new FEC parameter set, during write operations to a first corrupted page in the flash memory; and
  means for mapping the first corrupted page and at least one additional corrupted page in the flash memory to a single logical page with an expected page size.

34. The apparatus of claim 33, wherein the means for selecting selects in response to a write failure to the first corrupted page.

35. The apparatus of claim 33, wherein the means for selecting comprises means for selecting the new FEC parameter set from among multiple FEC parameter sets, each providing different amounts of redundancy.

36. The apparatus of claim 33, further comprising means for storing the new FEC parameter set in the first corrupted page and another FEC parameter set in the at least one additional corrupted page.

37. The apparatus of claim 33, further comprising means for reading and writing data to the single logical page based on received instructions.

* * * * *